UNITED STATES PATENT OFFICE.

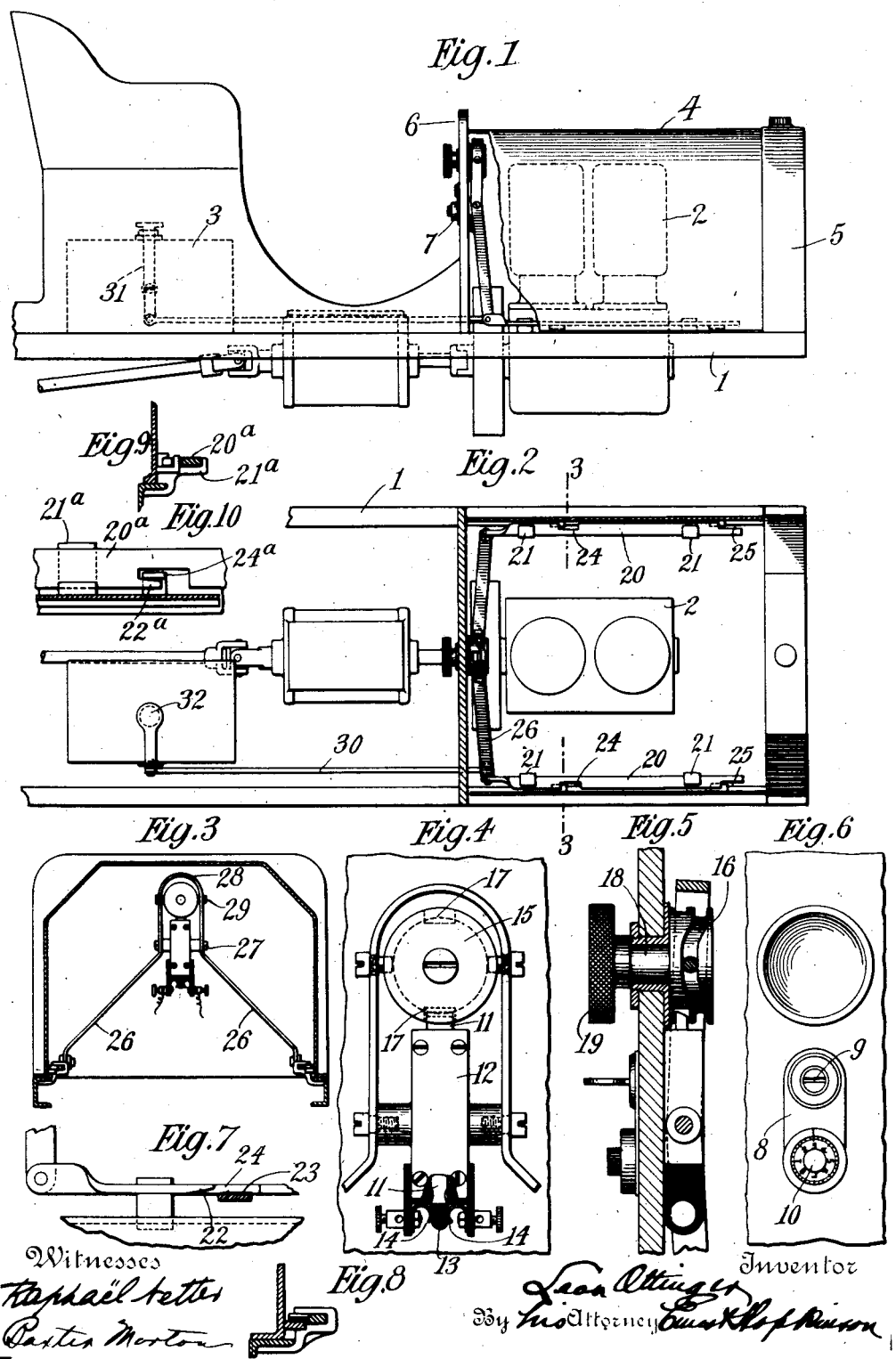

LEON OTTINGER, OF NEW YORK, N. Y.

DEVICE TO PREVENT TAMPERING WITH OR THEFT OF MOTOR-VEHICLES.

No. 868,693.　　　　　Specification of Letters Patent.　　　　　Patented Oct. 22, 1907.

Application filed December 18, 1905. Serial No. 292,247.

*To all whom it may concern:*

Be it known that I, LEON OTTINGER, a citizen of the United States, residing in the city, county, and State of New York, have invented new and useful Improvements in Devices to Prevent Tampering with or Theft of Motor Vehicles, of which the following is a specification.

This invention relates to attachments to motor vehicles for preventing tampering with the mechanism of the vehicle and for preventing theft of the vehicle, and it relates especially to devices for securing the bonnet or hood over the motor of the vehicle in combination with a lock controlling the electric circuit for the motor, together with devices for locking the closure of the fuel tank. It is to be understood, however, that it is not essential in all phases of the invention that all of the elements above recited be combined, as certain of the elements coöperate effectively to produce certain results without necessarily including all the elements.

As is well known to users of motor vehicles, thefts of such vehicles frequently occur from the fact that unauthorized persons can complete the battery circuit of the vehicle in the absence of the owner, and so start the vehicle. Various devices have been produced for preventing unauthorized persons from completing the battery circuit of a motor vehicle, such as locking switches which can only be operated by persons having keys for the switch locks or knowing the combinations by which the locks are controlled. Such devices are ordinarily effective, and serve the purpose for which they are designed when the intending thief has only a few moments in which to complete the battery circuit. When, however, a motor vehicle is left un-guarded for a considerable period of time, a thief well acquainted with the general construction of motor vehicles can complete the battery circuit by raising the bonnet or hood over the motor and making a connection across the gap in the circuit where the battery wires are exposed adjacent to the dashboard.

The present invention has for its principal object the provision of a simple and effective device which may be mounted on the dashboard or in some other convenient location and which will serve the double purpose of preventing the completion of the battery circuit by operating the switch or plug, and of securely locking the hood or bonnet in position over the motor and the electric wires leading thereto.

The invention also has for one of its objects the provision of a locking device for the closure on the fuel tank which may be operatively connected with the device for operating the switch or plug so that the closure to the fuel tank will always be locked in place when the circuit is interrupted.
With the objects above stated in view, I preferably make use of a lock-controlled switch or plug mounted on the dashboard of the vehicle for making and breaking the circuit in wires leading to the motor, and a latch mechanism for the bonnet or hood over the motor which is operated from the dashboard and is controlled by the same lock that controls the switch or plug for the circuit.

In the drawings accompanying this specification and forming part thereof, I have illustrated an apparatus including the devices just mentioned, in connection with a closure for the fuel tank of the vehicle, which is operated simultaneously with the latch mechanism for the bonnet or hood and which will effectively prevent the theft of fuel from the tank or the mischievous introduction into the tank of any undesirable liquid. It is to be understood, moreover, that, if desired, closures or latches for other parts of the vehicle may be provided and connected with the latch mechanism of the bonnet or hood so as to be operated simultaneously therewith.

In the drawings: Figure 1 is a view in side elevation of a portion of the chassis and superstructure of a motor vehicle, with the motor and driving mechanism diagrammatically shown, and having anti-theft devices constructed according to the present invention mounted in operative position, a portion of the bonnet or hood of the vehicle being broken away. Fig. 2 is a plan view of the structure shown in Fig. 1, with the hood and the seat of the vehicle removed. Fig. 3 is a transverse section on the line 3—3 of Fig. 2. Figs. 4, 5, and 6 are enlarged detail views of the lock-controlled switch and the lock-controlled latch operating mechanism. Figs. 7 and 8 are detail views illustrating the action of the latches for the bonnet or hood. Figs. 9 and 10 are detail views illustrating the operation of a modified form of latch for the bonnet or hood.

Referring to the drawings by the reference characters, which designate corresponding parts in the several views, 1 designates the chassis of the vehicle, 2 the motor, and 3 the fuel tank.

A bonnet or hood 4 is shown over a motor in the usual position between the radiator 5 and the dashboard 6. This bonnet is supposed to tilt upward at the forward or rearward end, as may be desired.

Mounted on the dashboard 6 so as to be conveniently accessible to the driver of the vehicle, is a lock-controlled switch or circuit plug 7, the details of which are best illustrated in Figs. 3 and 4.

The lock 8 for the switch or circuit plug is preferably of the duplex type which may be operated either by means of a key introduced into the keyhole 9, or by means of a combination knob 10.

In operative connection with the lock 8 is a sliding bolt 11, which is preferably made of brass or other metal of suitable conductivity, and is arranged to slide in an insulated guide or casing 12. At the lower end of the bolt 11 is mounted a block 13 of vulcanite or other non-conducting material which lies between two yielding electrical contacts 14 when the bolt 11 is raised, thereby breaking the circuit. The bolt 11 is of sufficient length to extend a short distance above the guide or casing 12 when the circuit is broken by raising the bolt, and above the guide or casing 12 and in suitable proximity thereto is arranged a rotatable member 15, which is provided on its periphery with a cam groove 16, which is best shown in Fig. 5. The member 15 is provided with oppositely arranged recesses 17 to receive the bolt 11, and the member 15 is so placed that the bolt 11 cannot be raised except when one of the recesses 17 is in position to receive it.

From the foregoing description it will be seen that the making or breaking of the circuit between the contacts 14 is accomplished by means of the bolt 11, which can be operated only by means of the lock 8, thus making it impossible for any unauthorized person to make the circuit between these contacts. The rotatable member 15 above mentioned is secured on the stem or spindle 18 of a knurled knob 19 mounted on the dashboard of the vehicle immediately above the lock for the switch or circuit plug. The member 15 and the knob 19 are provided to enable the driver of the vehicle to operate the latches by which the bonnet or hood is secured in position. These latches consist of sliding bars 20 working in guides 21 on the chassis and provided, as best shown in Figs. 7 and 8, with wedging faces 22 for engagement with lugs 23 provided at adjacent points on the interior of the bonnet or hood 4. The lugs 23 are permitted to be raised when the latch bars are not in operative position by cutting away the bars at 24 and 25, as best seen in Figs. 3 and 7.

The latch bars 20 are operated by means of lever arms 26 fulcrumed at 27 and connected above the member 15 in an arch 28.

At the base of the arch 28, on each side of the member 15 is mounted a pin or stud 29 which engages with the cam groove 16 in the rotatable member 15. Consequently, a quarter turn of the member 15 will impart a rocking movement to the arms 26, thereby sliding the latch bars 20 forward or backward in the guides provided therefor. When the member 15 is in the position shown in Figs. 4 and 5 with the bolt 11 in engagement with one of the recesses 17, the latch bars are in operative position and the bonnet or hood 4 is firmly wedged against the chassis of the vehicle, as clearly shown in Fig. 3. At the same time, the circuit between the contacts 14 is interrupted and an unauthorized person cannot start the vehicle, as the members 15 and 19, by which the latches are operated, are firmly locked by the bolt 11, and this bolt cannot be depressed to release the member 15, except by the use of the lock 8. When the bolt 11 is depressed by the operation of the lock 8 so as to force the block of insulating material at the lower end of the bolt below the resilient contact members 14, and establish a circuit between the contact members by means of the metallic portion of the bolt, the rotatable member 15 will be released and may be turned by means of the knob 19 so as to force the arch 28 connecting the levers 26 forward and retract the lower ends of those levers to which the latch bars are secured. The retraction of the latch bars will release the bonnet or hood 4 of the vehicle, so that the motor may be exposed to view.

Extending rearward from the bottom of one of the levers 26 is a connecting rod 30, which is preferably beneath the flooring of the vehicle so as to be entirely out of the way. At its rear end, the rod 30 is pivotally connected with a rocking arm 31 which carries a closure 32 for the fuel tank, which is preferably arranged beneath the driver's seat. The closure 32 is preferably a supplemental closure only which serves to hold the main closure in position. The main closure is preferably in the form of a screw stopper or other tight-fitting closure which will prevent evaporation of volatile liquid fuel, such as gasolene or alcohol. The arrangement of the connecting rod 30 and the rocking arm 31 in relation to the latch bars 20 is such that when the latch bars are in operative position the supplemental closure 32 is also in operative position, and when the latch bars are retracted into inoperative position, the supplemental closure 32 is shifted out of the way so that the main closure of the fuel tank may be removed.

Instead of the wedge faces 22, which act downwardly, it may be desirable at times to employ wedges on the latch bars which have a lateral action, and such wedges are illustrated in Figs. 9 and 10. The latch bar 20$^a$ in these figures works in the guide 21$^a$, of special construction, and lugs 22$^a$ having inclined operating faces coact with lugs 24$^a$ upon the bonnet or hood of the vehicle.

From the foregoing description and the accompanying drawings it will be observed that I have provided means for effectively protecting the motor, the electric circuit, and the fuel tank from meddlers or thieves, thus making it practically impossible for any unauthorized person to start the vehicle in the absence of the owner or driver without demolishing the hood or bonnet to expose the circuit wires near the motor. It will also be noted that the devices for securing the hood or bonnet and for protecting the fuel tank are so constructed and arranged that they must be in operative position when the circuit is broken by retracting the bolt 11, thus making it impossible for the driver or owner to neglect the securing of the bonnet or hood or the protection of the fuel tank when breaking the circuit to the motor.

A special feature of the invention is the arrangement of the device for operating the latch bars and the closure for the fuel tank upon the dashboard of the vehicle where it is within easy reach of the driver and can be instantly operated, if desired.

While I have described only one specific form of mechanism for accomplishing the object of my invention, it will be obvious that many variations therein may be made without departing from the spirit of the invention or sacrificing its advantages, and I do not limit myself to the precise mechanism shown and described, but reserve the right to make modifications therein within the scope of the claims.

Having thus described my invention, what I claim and desire to secure by Letters Patent is:

1. An anti-theft device for motor vehicles, comprising a latch mechanism for the bonnet or hood, an electric switch for the motor circuit, and a lock for controlling both said switch and said latch mechanism.

2. An anti-theft device for motor vehicles, comprising a latch for the bonnet or hood and a lock on the dashboard coöperating with said latch to secure the latch in operative position.

3. An anti-theft device for motor vehicles comprising a latch mechanism for the bonnet or hood, and a lock mounted on the dashboard of the motor vehicle and having a bolt engaging with said latch mechanism to secure it in operative position.

4. In apparatus of the character specified, the combination with a latch mechanism for the bonnet or hood of a motor vehicle, of means mounted on the dashboard of the vehicle for operating the latch mechanism.

5. In apparatus of the character described, the combination with a fixed contact of a movable contact member in the form of a bolt, a latch mechanism for the bonnet or hood of a motor vehicle, said latch mechanism being adapted to be locked in operative position by means of said movable contact member when said movable contact member is not in electrical contact with the fixed contact member.

6. In apparatus of the character described, the combination with a latch mechanism for the bonnet or hood of a motor vehicle of an electric switch comprising a movable bolt adapted to engage said latch mechanism to secure it in operative position, and a lock operatively connected with said switch, whereby said bolt may be thrown into and out of engagement with said latch mechanism.

7. In apparatus of the character described, the combination with a latch mechanism for the bonnet or hood of a motor vehicle, of a closure for the fuel tank of the vehicle, and connections between said latch mechanism and said closure whereby the movement of the latch mechanism into operative position will throw the closure into operative position.

8. In apparatus of the character described, a supplemental closure for the fuel tank of a motor vehicle, and mechanism mounted on the dashboard of the vehicle to throw said closure into and out of operative position.

9. A latch mechanism for the bonnet or hood of a motor vehicle, comprising a latching member having an inclined or wedging face whereby the bonnet or hood is simultaneously latched and pressed into firm engagement with the structure upon which it is supported.

In testimony whereof, I have signed my name in the presence of two witnesses.

LEON OTTINGER.

Witnesses:
BAXTER MORTON,
H. RICHARD WÖBSE.